United States Patent
Choi et al.

(10) Patent No.: US 12,106,219 B2
(45) Date of Patent: Oct. 1, 2024

(54) METHOD AND APPARATUS WITH NEURAL NETWORK DATA QUANTIZING

(71) Applicants: Samsung Electronics Co., Ltd., Suwon-si (KR); Korea Advanced Institute of Science and Technology, Daejeon (KR)

(72) Inventors: Seungkyu Choi, Daejeon (KR); Sangwon Ha, Seongnam-si (KR); Lee-Sup Kim, Daejeon (KR); Jaekang Shin, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 1020 days.

(21) Appl. No.: 15/931,362

(22) Filed: May 13, 2020

(65) Prior Publication Data

US 2021/0110270 A1    Apr. 15, 2021

(30) Foreign Application Priority Data

Oct. 11, 2019    (KR) .................. 10-2019-0126298

(51) Int. Cl.
*G06N 3/084*    (2023.01)
*G06N 3/04*    (2023.01)
*G06N 3/0495*    (2023.01)

(52) U.S. Cl.
CPC .............. *G06N 3/084* (2013.01); *G06N 3/04* (2013.01); *G06N 3/0495* (2023.01)

(58) Field of Classification Search
CPC ........ G06N 3/084; G06N 3/04; G06N 3/0495; G06N 3/045; G06N 3/063; G06N 3/082; G06V 10/95; G06V 10/955
See application file for complete search history.

(56) References Cited

U.S. PATENT DOCUMENTS

2018/0349764 A1    12/2018    Zhang et al.
2019/0042529 A1    2/2019    Nurvitadhi et al.
(Continued)

FOREIGN PATENT DOCUMENTS

EP    3 438 890 A1    2/2019
KR    10-2018-0120967 A    11/2018
(Continued)

OTHER PUBLICATIONS

Zhou, Shuchang, et al. "Dorefa-net: Training low bitwidth convolutional neural networks with low bitwidth gradients." arXiv preprint arXiv:1606.06160 (2016). (Year: 2016).*
(Continued)

*Primary Examiner* — Kakali Chaki
*Assistant Examiner* — Michael H Hoang
(74) *Attorney, Agent, or Firm* — NSIP Law

(57) ABSTRACT

A neural network data quantizing method includes: obtaining local quantization data by firstly quantizing, based on a local maximum value for each output channel of a current layer of a neural network, global recovery data obtained by recovering output data of an operation of the current layer based on a global maximum value corresponding to a previous layer of the neural network; storing the local quantization data in a memory to perform an operation of a next layer of the neural network; obtaining global quantization data by secondarily quantizing, based on a global maximum value corresponding to the current layer, local recovery data obtained by recovering the local quantization data based on the local maximum value for each output channel of the current layer; and providing the global quantization data as input data for the operation of the next layer.

20 Claims, 13 Drawing Sheets

(56) References Cited

U.S. PATENT DOCUMENTS

| | | | |
|---|---|---|---|
| 2019/0042948 A1 | 2/2019 | Lee et al. | |
| 2020/0057934 A1 | 2/2020 | Yoo et al. | |

FOREIGN PATENT DOCUMENTS

| | | |
|---|---|---|
| KR | 10-2019-0014900 A | 2/2019 |
| WO | WO 2019/056946 A1 | 3/2019 |

OTHER PUBLICATIONS

Buck, Joe B., et al. "Scihadoop: Array-based query processing in hadoop." Proceedings of 2011 International Conference for High Performance Computing, Networking, Storage and Analysis. 2011. (Year: 2011).*

Lai, Liangzhen, Naveen Suda, and Vikas Chandra. "Cmsis-nn: Efficient neural network kernels for arm cortex-m cpus." arXiv preprint arXiv:1801.06601 (2018). (Year: 2018).*

Yang J, Shen X, Xing J, Tian X, Li H, Deng B, Huang J, Hua XS. Quantization networks. InProceedings of the IEEE/CVF Conference on Computer Vision and Pattern Recognition 2019 (pp. 7308-7316). https://openaccess.thecvf.com/content_CVPR_2019/papers/Yang_Quantization_Networks_CVPR_2019_paper.pdf (Year: 2019).*

Lee, Jun Haeng, et al. "Quantization for rapid deployment of deep neural networks." arXiv preprint arXiv:1810.05488 (2018). https://arxiv.org/pdf/1810.05488.pdf (Year: 2018).*

Krishnamoorthi, Raghuraman. "Quantizing deep convolutional networks for efficient inference: A whitepaper." arXiv preprint arXiv:1806.08342 (2018). https://arxiv.org/pdf/1806.08342.pdf (Year: 2018).*

Zhou, Shuchang, et al. "Dorefa-net: Training low bitwidth convolutional neural networks with low bitwidth gradients." arXiv preprint arXiv:1606.06160 (2016) (13 pages in English).

Choi, Seungkyu, et al. "An Optimized Design Technique of Low-bit Neural Network Training for Personalization on IoT Devices." *Proceedings of the 56th Annual Design Automation Conference 2019*. 2019 (6 pages in English).

Wu, Shuang, et al. "Training and inference with integers in deep neural networks." arXiv preprint arXiv:1802.04680 (2018) (14 pages in English).

Chen, Shangyu, Wenya Wang, and Sinno Jialin Pan. "Deep neural network quantization via layer-wise optimization using limited training data." Proceedings of the AAAI Conference on Artificial Intelligence. vol. 33. No. 01. 2019 (8 pages in English).

Extended European search Report issued on Jan. 28, 2021 in counterpart EP Application No. 20183579.0 (10 pages in English).

* cited by examiner

Algorithm 1 Pseudo-code for LMQ in the backward phase

1: Quantization level selection: W, A, G
   // Exception in the 1st and last layer as usual.
   // Forward phase has the same LMQ process of backward.
2: $weight_W$ ← Quantize (weight, global_max)
3: for l = layer_num to 1 do // Loss back-propagation
   // channel_in is the output channel since it back-propagates.
4:    for $C_{out}$ = 1 to channel_in do
5:       for $C_{in}$ = 1 to channel_out do
6:          loss_gradient ← Recover (loss_gradient$_G$, local_max$c_{in}$)   — 1201
7:          loss_gradient$_G$ ← Quantize (loss_gradient, global_max$_i$)   — 1202
8:          Backward_convolution (loss_gradient$_G$, weight$_W$)   — 1203
9:       end
10:     loss_gradient ← Recover (loss_gradient$_G$, global_max$c_i$)   — 1204
11:     Backward_batchnorm, Backward_pool, Backward_relu   — 1205
12:     local_max$c_{out}$ ← Find_max (loss_gradient)   — 1206
13:     loss_gradient$_G$ ← Quantize (loss_gradient, local_max$c_{out}$)   — 1207
14:    end
15:    global_max$_{l-1}$ ← Find_max (local_max$c_1$, local_max$c_2$, ...)   — 1208
16: end
17: for l = layer_num to 1 do //Weight update
18:    Weight_gradient_computation(activation$_A$, loss_gradient$_G$)
19:    Weight$_l$, w_grad$_l$ ← Recover(weight$_W$), Recover(w_grad$_{A,G}$)
20:    Weight update(Weight$_l$, w_grad$_l$)
21: end

METHOD AND APPARATUS WITH NEURAL NETWORK DATA QUANTIZING

CROSS-REFERENCE TO RELATED APPLICATION

This application claims the benefit of Korean Patent Application No. 10-2019-0126298, filed on Oct. 11, 2019, in the Korean Intellectual Property Office, the disclosure of which is incorporated by reference herein in its entirety for all purposes.

BACKGROUND

1. Field

The present disclosure relates to a method of and an apparatus with neural network data quantizing.

2. Description of Related Art

A neural network may be a computing system based on a computational architecture. Input data may be analyzed by using a neural network apparatus in various types of electronic systems and valid information may be extracted.

A typical neural network apparatus may need to perform a large amount of computations in order to process complicated input data. Moreover, when the neural network apparatus needs to perform such large amount of computations, the typical neural network apparatus may not efficiently process network operations and therefore may not analyze (or may not efficiently analyze) input data and/or extract (or efficiently extract) information in real time, e.g., when embedded or implemented by a low-power and high-performance system such as a smartphone having limited performance resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network data quantizing method includes: obtaining local quantization data by firstly quantizing, based on a local maximum value for each output channel of a current layer of a neural network, global recovery data obtained by recovering output data of an operation of the current layer based on a global maximum value corresponding to a previous layer of the neural network; storing the local quantization data in a memory to perform an operation of a next layer of the neural network; obtaining global quantization data by secondarily quantizing, based on a global maximum value corresponding to the current layer, local recovery data obtained by recovering the local quantization data based on the local maximum value for each output channel of the current layer; and providing the global quantization data as input data for the operation of the next layer.

The recovering of the output data of the operation of the current layer may include recovering the output data of the operation of the current layer for each output channel based on the global maximum value corresponding to the previous layer, and the global maximum value may be generated based on data obtained by recovering the output data of an operation of the previous layer.

The global maximum value may be a greatest value among values of output channels of the recovered output data of the operation of the previous layer.

The firstly quantizing of the global recovery data may include firstly quantizing the global recovery data for each output channel respectively based on the local maximum value that is a maximum value of the global recovery data for the output channel, such that the maximum value of the global recovery data for each output channel is quantized into a same value.

The recovering of the local quantization data may include recovering the local quantization data for each output channel respectively based on the local maximum value that is a maximum value of the global recovery data for the output channel, such that the local quantization data is recovered to data previous to the first quantization.

The data previous to the first quantization may correspond to the global recovery data.

The secondarily quantizing of the local recovery data may include secondarily quantizing the local recovery data for each output channel based on the global maximum value that is a maximum value of the local recovery data, such that the local recovery data is quantized to a same scale.

The obtaining of the local quantization data further may include: recovering the output data of the operation of the current layer based on the global maximum value corresponding to the previous layer; and obtaining the global recovery data by performing a pooling operation on the recovered data.

The method may include: storing the local maximum value for each output channel of the current layer, the local maximum values being obtained by calculating a maximum value of the global recovery data for each output channel of the current layer; and storing, in a register, the global maximum value corresponding to the current layer, the global maximum value corresponding to the current layer being obtained by calculating a maximum value of the local maximum values.

The obtaining of the local quantization data may be sequentially performed for each output channel.

The operation of the current layer and the operation of the next layer may be based on backward propagation, and the output data of the operation of the current layer and the input data for the operation of the next layer may include either one of an activation, a loss gradient, and a weight gradient.

The method may include training the neural network by performing the operation of the next layer based on the global quantization data.

A non-transitory computer-readable storage medium may store instructions that, when executed by a processor, configure the processor to perform the method.

In another general aspect, a neural network data quantizing apparatus includes: a processor configured to: obtain local quantization data by firstly quantizing, based on a local maximum value for each output channel of a current layer of a neural network, global recovery data obtained by recovering output data of an operation of the current layer based on a global maximum value corresponding to a previous layer of the neural network; store the local quantization data in a memory to perform an operation of a next layer of the neural network; obtain global quantization data by secondarily quantizing, based on a global maximum value corresponding to the current layer, local recovery data obtained by recovering the local quantization data based on the local maximum value for each output channel of the current layer; and provide the global quantization data as input data for an operation of a next layer.

For the recovering of the output data of the operation of the current layer, the processor may be configured to recover the output data of the operation of the current layer for each output channel based on the global maximum value corresponding to the previous layer, and the global maximum value may be generated based on data obtained by recovering the output data of an operation of the previous layer.

For the firstly quantizing of the global recovery data, the processor may be configured to firstly quantize the global recovery data for each output channel respectively based on the local maximum value that is a maximum value of the global recovery data for the output channel, such that the maximum value of the global recovery data for each output channel is quantized into a same value.

For the recovering of the local quantization data, the processor may be configured to recover the local quantization data for each output channel respectively based on the local maximum value that is a maximum value of the global recovery data for the output channel, such that the local quantization data is recovered to data previous to the first quantization.

For the secondarily quantizing of the local recovery data, the processor may be configured to secondarily quantize the local recovery data for each output channel based on the global maximum value that is a maximum value of the local recovery data, such that the local recovery data is quantized to a same scale.

For the obtaining of the local quantization data, the processor may be configured to: recover the output data of the operation of the current layer based on the global maximum value corresponding to the previous layer; and obtain the global recovery data by performing a pooling operation on the recovered data.

The processor may be configured to: store the local maximum value for each output channel of the current layer, the local maximum values being obtained by calculating the maximum value of the global recovery data for each of all output channels of the current layer; and store, in a register, the global maximum value corresponding to the current layer, the global maximum value corresponding to the current layer being obtained by calculating a maximum value of the local maximum values.

For the obtaining of the local quantization data, the processor may be configured to sequentially obtain the local quantization data for each output channel.

The processor may be configured to perform the operation of the current layer and the operation of the next layer based on backward propagation, and the output data of the operation of the current layer and the input data for the operation of the next layer may each include any one of an activation, a loss gradient, and a weight gradient.

The apparatus may be any one of a personal computer (PC), a server device, a mobile device, a smartphone, a tablet device, an augmented reality (AR) device, an Internet of Things (IoT) device, an autonomous vehicle, a robotic device, and a medical device, and the processor may be configured to perform any one of voice recognition, image recognition, and image classification based on an output of the operation of the next layer.

The apparatus may include a memory storing instructions that, when executed by the processors, configure the processor to perform the obtaining of the local quantization data, the storing of the local quantization data, the obtaining of the global quantization, and the providing of the global quantization data.

In another general aspect, a neural network data quantizing method includes: globally recovering output data of a current layer of a neural network based on a global maximum value of a previous layer of the neural network; locally quantizing the globally recovered output data of the current layer based on local maximum values of output channels of the current layer; locally recovering the locally quantized data based on the local maximum values; globally quantizing the locally recovered data based on a global maximum value of output channels of the current layer; and providing the globally quantization data as input data for a next layer of the neural network.

Other features and aspects will be apparent from the following detailed description, the drawings, and the claims.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 illustrates a quantization algorithm of data of a neural network according to one or more embodiments of the present disclosure;

DETAILED DESCRIPTION

Figure 1:
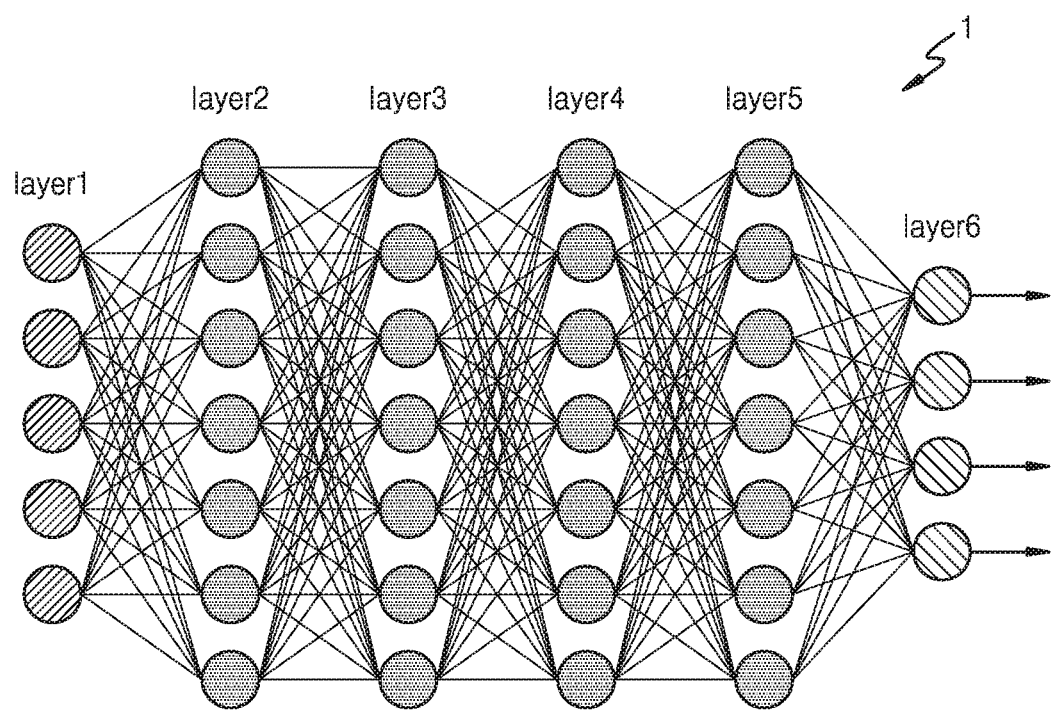
FIG. 1 illustrates a neural network according to one or more embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Reference will now be made in detail to embodiments, examples of which are illustrated in the accompanying drawings, wherein like reference numerals refer to like elements throughout. In this regard, the one or more embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The term used in the embodiments such as "unit", etc., indicates a unit for processing at least one function or operation, and where the unit is hardware or a combination of hardware and software.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Hereinbelow, embodiments will be described in detail with reference to the attached drawings. However, embodiments may be implemented in various forms, and are not limited to examples described herein.

FIG. 1 illustrates a neural network according to one or more embodiments of the present disclosure.

A neural network 1 illustrated in FIG. 1 may be, but is not limited to, an example of a deep neural network (DNN). For example, the neural network 1 may be a DNN including an input layer (Layer1), a plurality of hidden layers (Layer2, Layer3, Layer 4, and Layer5), and an output layer (Layer6).

When the neural network 1 is implemented as a DNN, the neural network 1 may include many layers capable of processing valid information. Thus, with the neural network 1, data sets that are more complex may be processed than with a neural network including a single layer. Meanwhile, the neural network 1 is illustrated as including six layers in FIG. 1, but this illustration is merely an example. In other words, the neural network 1 may include layers that are more than or less than those illustrated in FIG. 1. That is, the neural network 1 may include layers of various structures that are different from those illustrated in FIG. 1.

Figure 2:
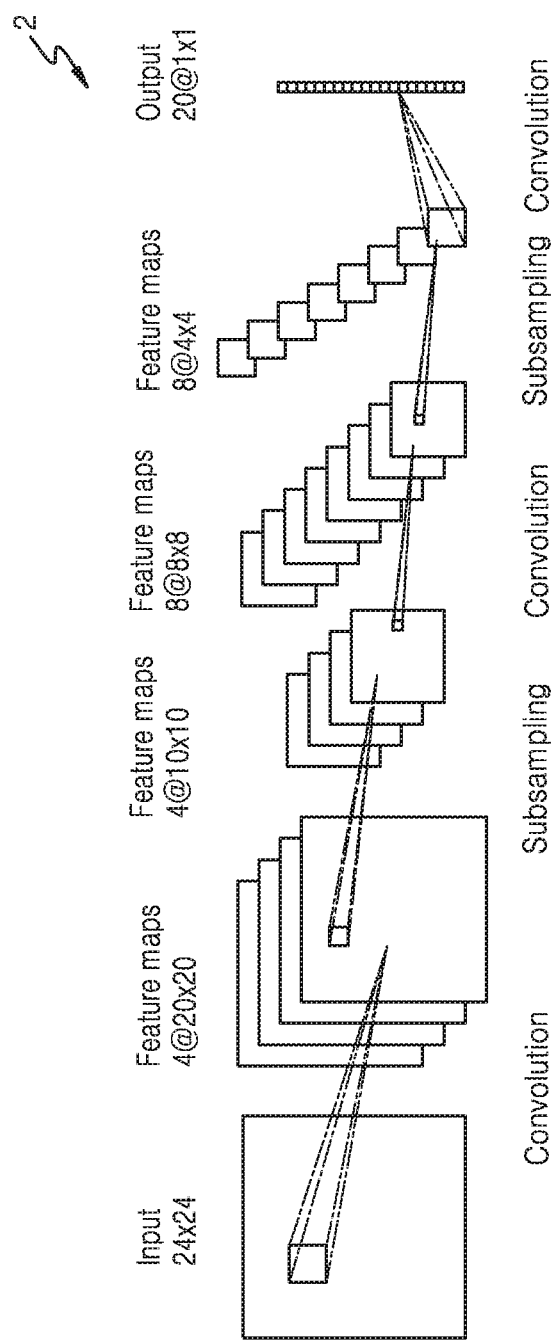
FIG. 2 illustrates an architecture of a neural network according to one or more embodiments of the present disclosure.

FIG. 2 illustrates an architecture of a neural network according to one or more embodiments of the present disclosure.

Some convolutional layers in a neural network 2 are illustrated in FIG. 2, the neural network 2 may further include pooling layers and fully connected layers, etc., as well as the illustrated convolutional layers and pooling (sub-sampling) layers.

The neural network 2 may be implemented as architecture having a plurality of layers that output feature maps. In the neural network 2, an operation is performed on an input image with a filter referred to as a kernel, and as a result, the feature maps are output to a next layer. The operation is performed again using another filter on the output feature maps, as input feature maps to a next layer resulting in new output feature maps. When the operation is repeatedly performed as such, a recognition result with respect to features of the input image may be finally output through the neural network 2.

For example, when an input image having a 24×24 pixel size is input to the neural network 2 of FIG. 2, the input image may be output as feature maps of four channels each having a 20×20 pixel size, through an operation with a first filter. That is, feature maps may be output for each of four output channels. The output feature maps of the four channels may be output as feature maps having a 10×10 pixel size for the four channels through a sub-sampling (or pooling) operation. Thereafter, sizes of the feature maps may be reduced through repeated operations using respective filters and sub-sampling (or pooling) operations, and finally, features each having a 1×1 pixel size may be output. In the neural network 2, the operations and the sub-sampling (or pooling) operations may be repeatedly performed in several stages so as to respectively filter and output robust features, which may represent the entire input image, from the input image, and to derive a recognition result, as a non-limiting example, of the input image through final features that are output. Based on the above, it is understood that example embodiments discussed herein include embodiments with one or more, in various combinations, or all such layers, stages, edges, etc. in operations of the neural network 2.

Figure 3:
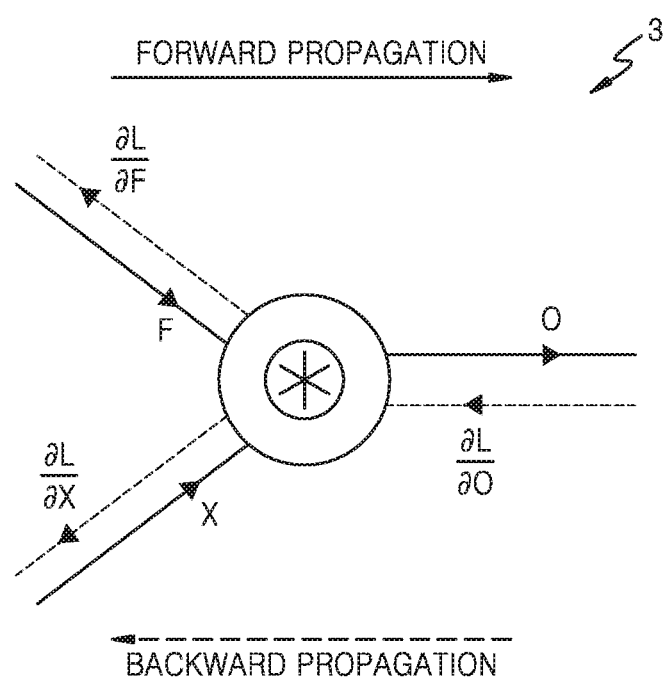
FIG. 3 illustrates forward propagation and backward propagation according to one or more embodiments of the present disclosure.
Figure 4:
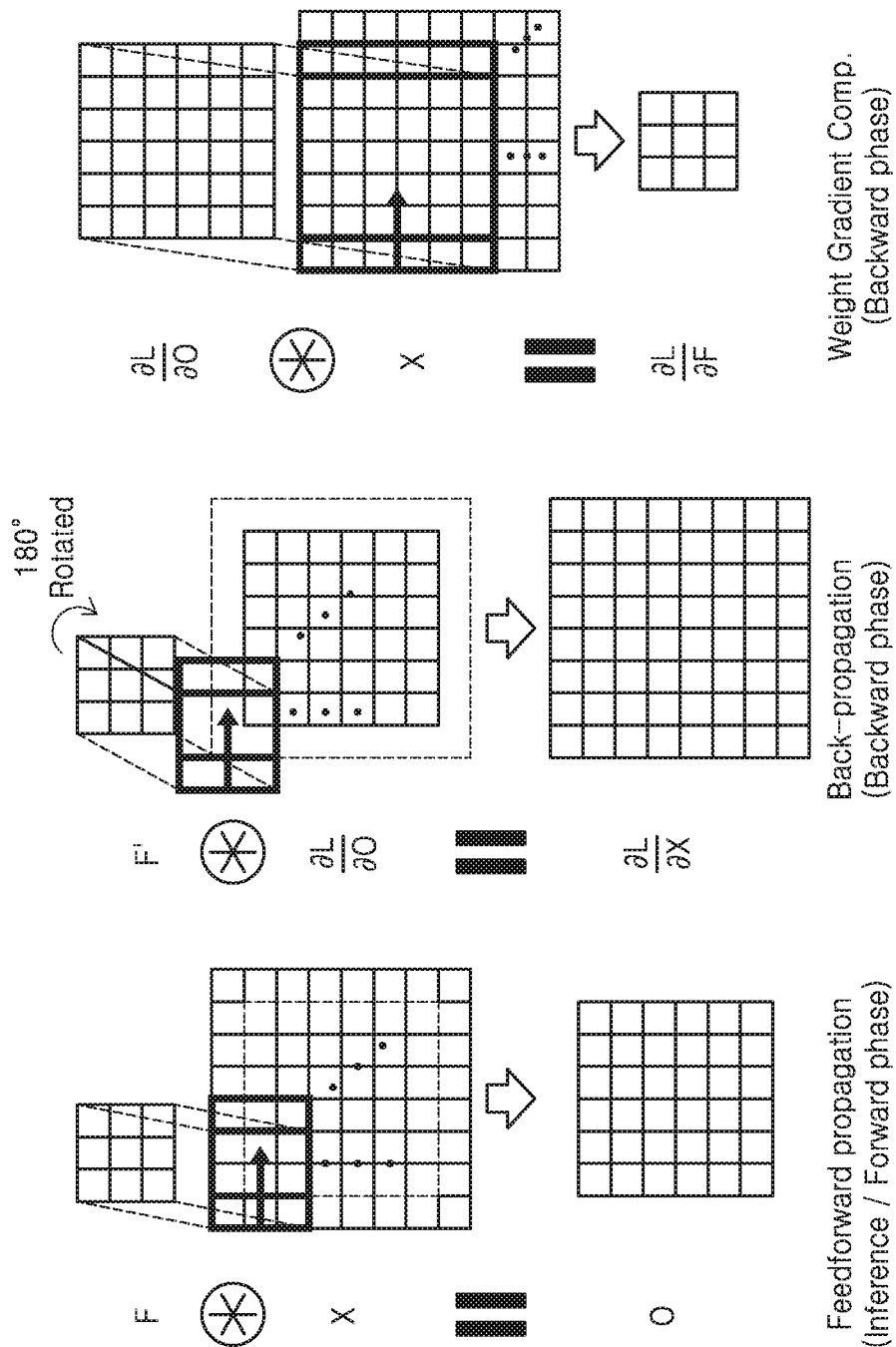
FIG. 4 illustrates an operation of a convolution layer in forward propagation and backward propagation according to one or more embodiments of the present disclosure.

Referring to FIGS. 3 and 4, forward propagation and backward propagation will be described according to one or more embodiments.

FIG. 3 illustrates forward propagation and backward propagation according to one or more embodiments of the present disclosure.

In FIG. 3, a part of a convolution layer 3 is illustrated. The convolution layer 3 of FIG. 3 may include an input feature map X, a filter F, and an output feature map O.

The input feature map X, the filter F, and the output feature map O may respectively correspond to input activations (as output activation, from a previous layer), weights, and output activations. A convolution operation may be performed on the input feature map using the filter F through forward propagation, resulting in the output feature map O. This convolution forward propagation is also referred to an inference operation.

For example, the filter F and the input feature map X may be subject to the convolution operation using a sliding window scheme. More specifically, input activations in a first window may be multiplied by weights of the filter, and products thereof may be summed. The window moves or slides in any axis direction (e.g., an x axis, a y axis, or a z axis) from the first window to a second window. Input activations in the second window may be multiplied by weights of the filter, and products thereof may be summed. When the convolution operation is continuously performed in this way, the output feature map O may be generated.

While one input feature map X and one filter F are illustrated in FIG. 3, the convolution operation may be performed on a plurality of input feature maps and a plurality of filters F to generate the output feature map O.

In a training process, once a final output feature map is generated, the final output feature map may be compared with an expected training result, thus generating a loss function. This process of training the neural network may be iteratively executed to minimize a loss of the loss function.

To minimize the loss of the loss function, a loss gradient $$\frac{\partial L}{\partial O}$$

may be propagated backward. The loss gradient may mean a gradient of activation.

Thus, during this training, the convolution operation may be performed on the backward-propagating loss gradient $$\frac{\partial L}{\partial O}$$

using a filter having elements rearranged from filter F, resulting in a loss gradient $$\frac{\partial L}{\partial X}$$

for backward propagation to a previous layer.

The convolution operation may also be performed on the loss gradient $$\frac{\partial L}{\partial O}$$

and the input feature map X, resulting in a weight gradient $$\frac{\partial L}{\partial F}.$$

FIG. 4 illustrates an operation of a convolution layer in forward propagation and backward propagation according to one or more embodiments of the present disclosure.

The convolution operation may be performed on the input feature map X and the filter F through forward propagation, resulting in the output feature map O. The input feature map may be, or based on, training data for example. For example, activation of the output feature map O may be generated based on a multiplication and accumulation (MAC) operation performed using activation of the input feature map X and a weight of the filter F.

For example, an output feature map $$O = \begin{bmatrix} o_{11} & o_{12} \\ o_{21} & o_{22} \end{bmatrix}$$

of an input feature map $$X = \begin{bmatrix} x_{11} & x_{12} & x_{13} \\ x_{21} & x_{22} & x_{23} \\ x_{31} & x_{32} & x_{33} \end{bmatrix}$$

and a filter $$F = \begin{bmatrix} f_{11} & f_{12} \\ f_{21} & f_{22} \end{bmatrix}$$

may be generated using Equation 1 below, for example.

$$o_{11} = x_{11}f_{11} + x_{12}f_{12} + x_{21}f_{21} + x_{22}f_{22}$$

$$o_{12} = x_{12}f_{11} + x_{13}f_{12} + x_{22}f_{21} + x_{23}f_{22}$$

$$o_{21} = x_{21}f_{11} + x_{22}f_{12} + x_{31}f_{21} + x_{32}f_{22}$$

$$o_{22} = x_{22}f_{11} + x_{23}f_{12} + x_{32}f_{21} + x_{33}f_{22} \quad \text{Equation 1:}$$

$x_{ij}$ indicates activation of the input feature map X, $f_{ij}$ indicates the weight of the filter F, and $o_{ij}$ indicates the resultant activation of the output feature map O.

The backward-propagating loss gradient $$\frac{\partial L}{\partial O}$$

and a filter F' having rearranged elements may be subject to the convolution operation, resulting in a loss gradient $$\frac{\partial L}{\partial X}$$

for backward propagation to a next previous layer, e.g., as the corresponding loss gradient $$\frac{\partial L}{\partial O}$$

for the previous layer to adjust the filter of the previous layer. For example, an element of the loss gradient $$\frac{\partial L}{\partial X}$$

may be generated based on the MAC operation performed using an element of the loss gradient $$\frac{\partial L}{\partial O}$$

and a weight of the filter F'. In an example, the filter F' may be generated by rotating the elements of the filter F by 180 degrees.

For example, a loss gradient $$\frac{\partial L}{\partial X} = \begin{bmatrix} \frac{\partial L}{\partial x_{11}} & \frac{\partial L}{\partial x_{12}} & \frac{\partial L}{\partial x_{13}} \\ \frac{\partial L}{\partial x_{21}} & \frac{\partial L}{\partial x_{22}} & \frac{\partial L}{\partial x_{23}} \\ \frac{\partial L}{\partial x_{31}} & \frac{\partial L}{\partial x_{32}} & \frac{\partial L}{\partial x_{33}} \end{bmatrix}$$

for backward propagation to a next layer from a backward-propagating loss gradient $$\frac{\partial L}{\partial O} = \begin{bmatrix} \frac{\partial L}{\partial o_{11}} & \frac{\partial L}{\partial o_{12}} \\ \frac{\partial L}{\partial o_{21}} & \frac{\partial L}{\partial o_{22}} \end{bmatrix}$$

and a filter $$F' = \begin{bmatrix} f_{22} & f_{21} \\ f_{12} & f_{11} \end{bmatrix}$$

having rearranged elements may be generated using Equation 2 below, for example.

$$\frac{\partial L}{\partial x_{11}} = \frac{\partial L}{\partial o_{11}} f_{11}$$ Equation 2

$$\frac{\partial L}{\partial x_{12}} = \frac{\partial L}{\partial o_{11}} f_{12} + \frac{\partial L}{\partial o_{12}} f_{11}$$

$$\frac{\partial L}{\partial x_{13}} = \frac{\partial L}{\partial o_{12}} f_{12}$$

$$\frac{\partial L}{\partial x_{21}} = \frac{\partial L}{\partial o_{11}} f_{21} + \frac{\partial L}{\partial o_{21}} f_{11}$$

$$\frac{\partial L}{\partial x_{22}} = \frac{\partial L}{\partial o_{11}} f_{22} + \frac{\partial L}{\partial o_{12}} f_{21} + \frac{\partial L}{\partial o_{21}} f_{12} + \frac{\partial L}{\partial o_{22}} f_{11}$$

$$\frac{\partial L}{\partial x_{23}} = \frac{\partial L}{\partial o_{12}} f_{22} + \frac{\partial L}{\partial o_{22}} f_{12}$$

$$\frac{\partial L}{\partial x_{31}} = \frac{\partial L}{\partial o_{21}} f_{21}$$

$$\frac{\partial L}{\partial x_{32}} = \frac{\partial L}{\partial o_{21}} f_{22} + \frac{\partial L}{\partial o_{22}} f_{21}$$

$$\frac{\partial L}{\partial x_{33}} = \frac{\partial L}{\partial o_{22}} f_{22}$$

The convolution operation may also be performed on the backward-propagating loss gradient $$\frac{\partial L}{\partial O}$$

and the input feature map X, resulting in a weight gradient $$\frac{\partial L}{\partial F}.$$

For example, an element of the weight gradient $$\frac{\partial L}{\partial F}$$

may be generated based on the MAC operation performed using an element of the loss gradient $$\frac{\partial L}{\partial O}$$

and activation of the input feature map X.

For example, a weight gradient, $$\frac{\partial L}{\partial F} = \begin{bmatrix} \frac{\partial L}{\partial f_{11}} & \frac{\partial L}{\partial f_{12}} \\ \frac{\partial L}{\partial f_{21}} & \frac{\partial L}{\partial f_{22}} \end{bmatrix},$$

for backward propagation to a next layer may be generated from the input feature map $$X = \begin{bmatrix} x_{11} & x_{12} & x_{13} \\ x_{21} & x_{22} & x_{23} \\ x_{31} & x_{32} & x_{33} \end{bmatrix}$$

and a loss gradient $$\frac{\partial L}{\partial O} = \begin{bmatrix} \frac{\partial L}{\partial o_{11}} & \frac{\partial L}{\partial o_{12}} \\ \frac{\partial L}{\partial o_{21}} & \frac{\partial L}{\partial o_{22}} \end{bmatrix}$$

backward-propagating from a previous layer, by using Equation 3 below, for example.

$$\frac{\partial L}{\partial f_{11}} = \frac{\partial L}{\partial o_{11}}x_{11} + \frac{\partial L}{\partial o_{12}}x_{12} + \frac{\partial L}{\partial o_{21}}x_{21} + \frac{\partial L}{\partial o_{22}}x_{22} \quad \text{Equation 3}$$

$$\frac{\partial L}{\partial f_{12}} = \frac{\partial L}{\partial o_{11}}x_{12} + \frac{\partial L}{\partial o_{12}}x_{13} + \frac{\partial L}{\partial o_{21}}x_{22} + \frac{\partial L}{\partial o_{22}}x_{23}$$

$$\frac{\partial L}{\partial f_{21}} = \frac{\partial L}{\partial o_{11}}x_{21} + \frac{\partial L}{\partial o_{12}}x_{22} + \frac{\partial L}{\partial o_{21}}x_{31} + \frac{\partial L}{\partial o_{22}}x_{32}$$

$$\frac{\partial L}{\partial f_{22}} = \frac{\partial L}{\partial o_{11}}x_{22} + \frac{\partial L}{\partial o_{12}}x_{23} + \frac{\partial L}{\partial o_{21}}x_{32} + \frac{\partial L}{\partial o_{22}}x_{33}$$

Figure 5:
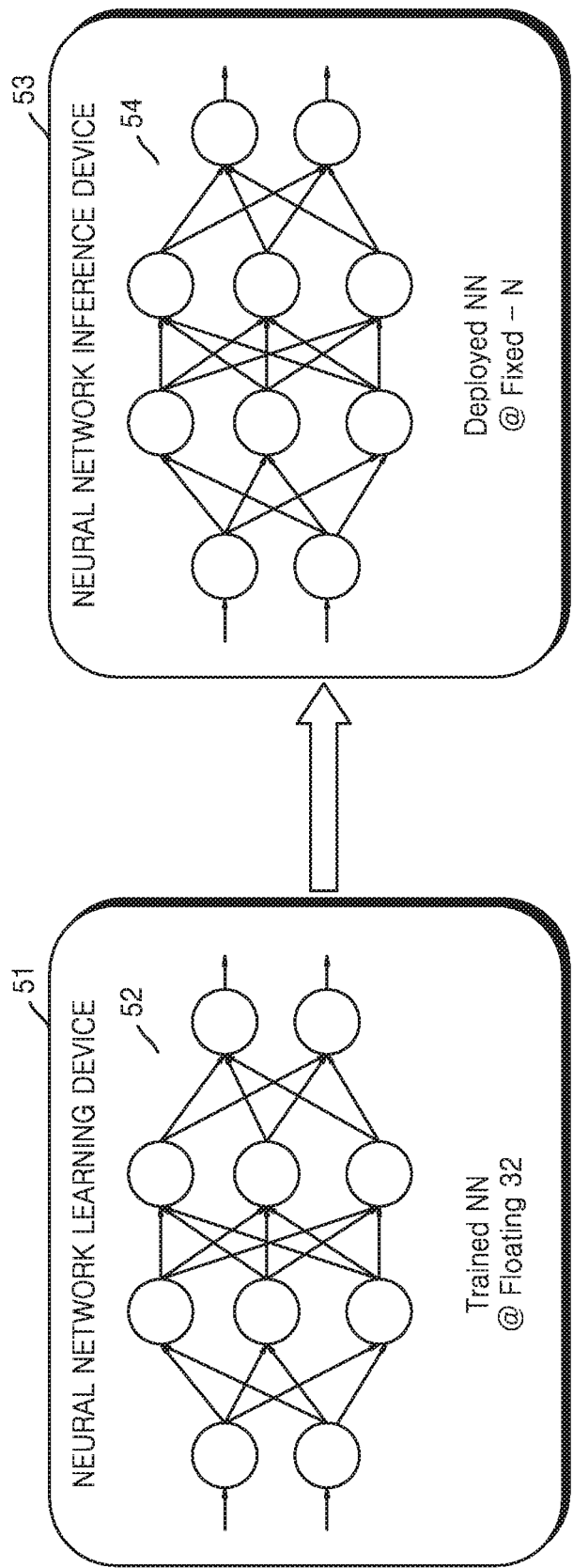
FIG. 5 illustrates a neural network learning device and a neural network inference device according to one or more embodiments of the present disclosure.

FIG. 5 illustrates a neural network learning device and a neural network inference device according to one or more embodiments of the present disclosure.

Referring to FIG. 5, a neural network learning device 51 may be a computing device having various processing functions such as functions of creating and training (or learning) a neural network, quantizing data of the neural network, or retraining the neural network. For example, the neural network learning device 51 may be implemented with, or as, various types of devices such as a personal computer (PC), a server device, a mobile device, etc.

The neural network learning device 51 may create a trained neural network 52 by repeatedly training (learning) a given initial neural network. Data in a floating-point format may be quantized into a fixed-point format in a training process, and/or data in the fixed-point format may undergo an operation process and then quantized back into the fixed-point format.

The neural network learning device 51 may deliver the trained neural network 52 to a hardware accelerator such as a neural network inference device 53. The neural network inference device 53 may be, or be included in, a mobile device, an embedded device, etc. The neural network inference device 53, which is hardware for driving a neural network 54, may be implemented with relatively low power or low performance, and thus may be properly implemented for a fixed-point operation rather than a floating-point operation. A function of the neural network inference device 53 is not limited to driving of the neural network 54, and may include functions of the neural network learning device 51. In an example, the neural network inference device 53 may perform training operations herein and the neural network learning device 51 may perform inference operations described herein.

The neural network inference device 53 may correspond to, but not limited to, a dedicated module for driving a neural network, such as a neural processing unit (NPU), a tensor processing unit (TPU), a neural engine, etc. The neural network inference device 53 may be included in, but not limited to, an autonomous vehicle, robotics, a smartphone, a tablet device, an augmented reality (AR) device, an Internet of Things (IoT) device, etc., which performs voice recognition, image recognition, etc., using a neural network.

Figure 6:
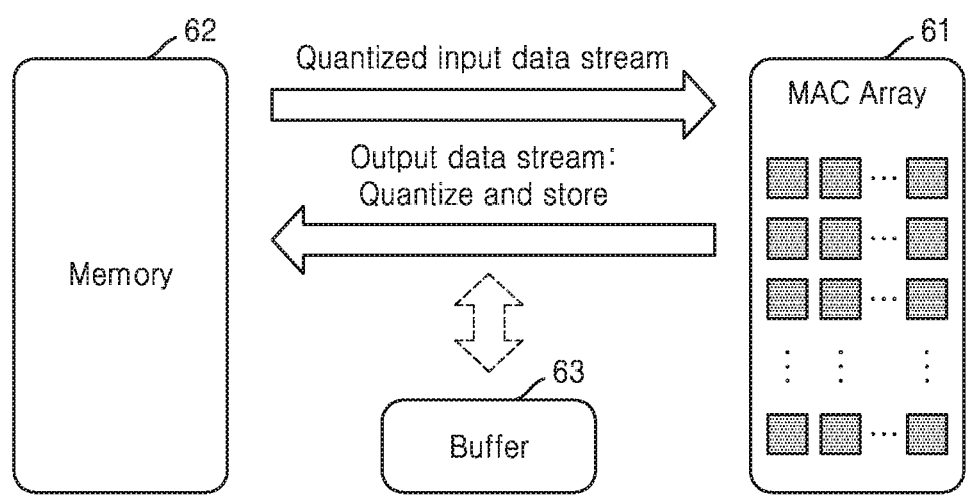
FIG. 6 illustrates quantizing data of a neural network according to one or more embodiments of the present disclosure.

FIG. 6 illustrates quantizing data of a neural network according to one or more embodiments of the present disclosure.

In driving or training of a neural network, a process of performing (by a calculator 61) an operation of a current layer, quantizing data output as a result of the operation, storing the quantized data in a memory 62, and reading data stored in the memory 62, and inputting the read data into the calculator 61 for use in an operation to a next layer may be repeatedly performed.

In forward propagation, output data resulting from an operation may include activation. In backward propagation, output data resulting from an operation may include a loss gradient and a weight gradient.

Meanwhile, prior to quantization, the output data resulting from the operation may be stored in an on-chip memory serving as a cache.

A neural network inference device included in a smartphone, a tablet, a wearable device, etc., having relatively low processing performance may have a limited space of an on-chip memory. Accordingly, a method of quantizing data of a neural network according to one or more embodiments may quantize data to sufficiently reduce a space used by the on-chip memory in storing the data, such that the neural network may be efficiently driven and/or trained using the neural network inference device having a limited resource (such as the limited space of the on-chip memory), thereby improving the functioning of the neural network inference device with which the neural network may be driven and/or trained. Moreover, by sequentially quantizing output data for each channel of a neural network layer, the method of quantizing data of the neural network according to one or more embodiments may reduce the amount of resources used by the on-chip memory compared to a typical quantization method which may quantize all output data of the layer, thereby improving.

Hereinbelow, a method of quantizing data of a neural network according to one or more embodiments will be described with reference to FIGS. 7 through 8.

Figure 7:
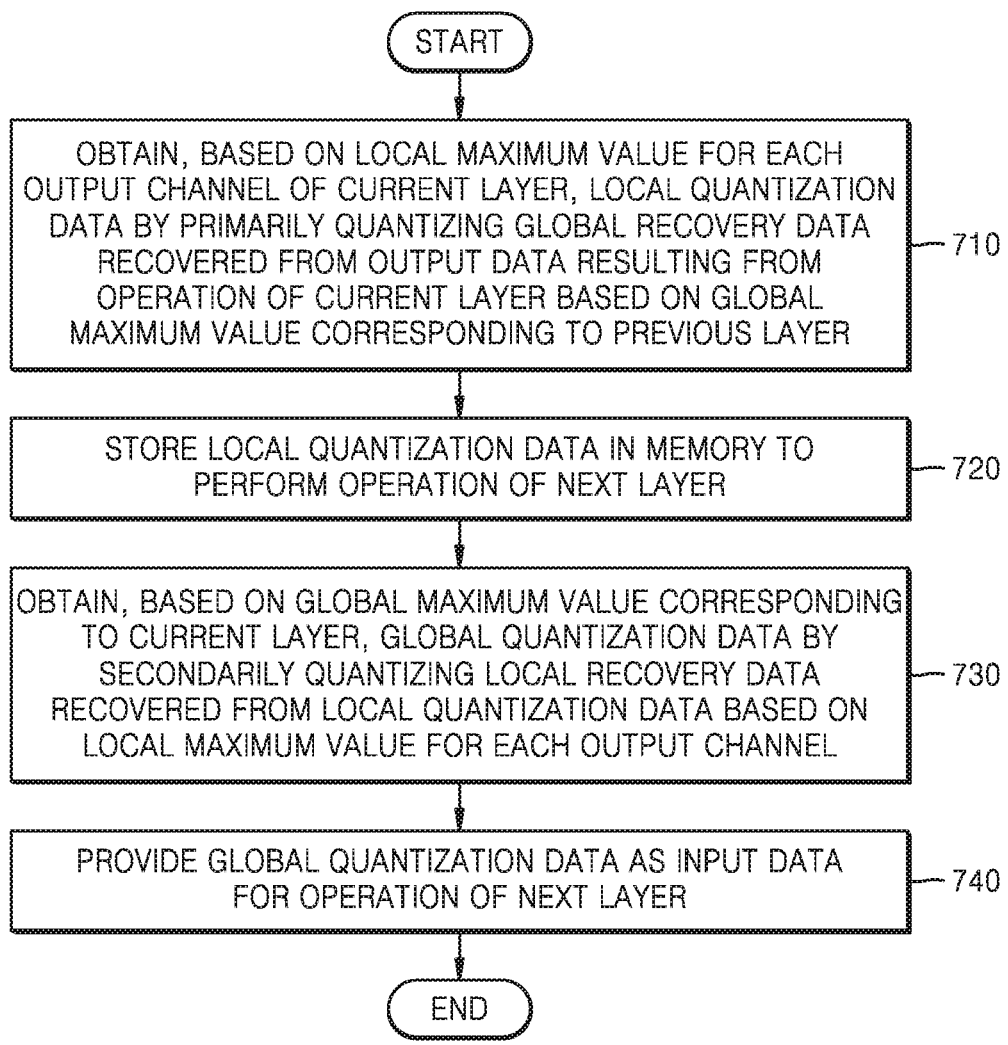
FIG. 7 illustrates a method of quantizing data of a neural network according to one or more embodiments of the present disclosure.

FIG. 7 illustrates a method of quantizing data of a neural network according to one or more embodiments of the present disclosure.

The flowchart illustrated in FIG. 7 may include operations processed in time series by a neural network apparatus 1400 to be described later with reference to FIG. 14. Matters described below may be applied to the neural network apparatus 1400.

In operation 710, a processor 1420 of the neural network device 1400 may primarily (e.g., firstly) quantize global recovery data (recovered from output data of an operation of a current layer based on a global maximum value corresponding to a previous layer) based on a local maximum value for each output channel of the current layer, thereby obtaining local quantization data.

The previous layer and the current layer may be, but not limited to, an input layer, a hidden layer, and an output layer, etc., of a DNN. The previous layer and the current layer may be, but not limited to, a layer included in a convolution neural network. The previous layer and the current layer may be, but not limited to, a convolution layer, a pooling layer, a flatten layer, a normalization layer, a fully connected layer, etc.

When the neural network apparatus 1400 drives the neural network through forward propagation, output data resulting from the operation of the current layer may include activation. Further, when the neural network apparatus 1400 trains the neural network through backward propagation, output data resulting from the operation of the current layer may include a loss gradient or a weight gradient.

The processor 1420 may recover the output data resulting from the operation of the current layer based on the global maximum value corresponding to the previous layer, thus generating global recovery data. Data recovery may mean that data is dequantized into a scale previous to quantization.

The processor 1420 may recover the output data resulting from the operation of the current layer based on the global maximum value corresponding to the previous layer and perform sub-operations such as the pooling operation, arrangement normalization, activation using the activation function, etc., thus generating the global recovery data.

The processor 1420 may add noise to the output data resulting from the operation of the current layer to generate the global recovery data. By performing primary (first) quantization with respect to the global recovery data generated by addition of the noise to the output data, the learning performance of the neural network may be improved. Noise may be, but not limited to, Gaussian noise, uniform noise, white noise, etc.

The global maximum value corresponding to the previous layer may be a value generated based on the output data resulting from the operation of the previous layer. For example, the global maximum value corresponding to the previous layer may be a maximum value of recovered output data when the output data resulting from the operation of the previous layer is recovered.

The output data resulting from the operation of the current layer may be recovered based on Equation 4 below, for example. To recover the output data resulting from the operation of the current layer, the global maximum value corresponding to the previous layer may be used as max (|x|) in Equation 4, and the output data of the operation of the current layer may be used as $\max q_n(x)$.

$$x = 2\max(|x|) \cdot [\max q_n(x) - \tfrac{1}{2}] \qquad \text{Equation 4:}$$

The processor 1420 may recover the output data resulting from the operation of the current layer for each output channel of the current layer. As the output data resulting from the operation of the current layer is recovered for each output channel of the current layer, the global recovery data may be generated for each output channel of the current layer. The global recovery data generated for each output channel of the current layer may be quantized based on a separate reference value for each output channel of the current layer.

The processor 1420 may sequentially recover the output data resulting from the operation of the current layer for each output channel of the current layer. For example, when the current layer includes three output channels, the processor 1420 may recover output data of a second output channel after recovering output data of a first output channel, and then recover output data of a third output channel.

The processor 1420 may generate local quantization data by primarily quantizing the global recovery data based on the local maximum value for each output channel of the current layer. Primary quantization based on the local maximum value for each output channel of the current layer may mean quantization based on a separate reference value for each output channel of the current layer. The local maximum value may be a maximum value for each output channel of the current layer of the global recovery data.

The global recovery data may be quantized based on Equation 5 and Equation 6. To primarily quantize the global recovery data, the local maximum value for each output channel of the current layer may be used as of Equation 5, and the global recovery data may be used as x. In Equations 5 and 6 below, n may indicate the number of bits of a level for quantization.

$$\max q_n(x) = quantize_n\left[\frac{x}{2\max(|x|)} + \frac{1}{2}\right] \qquad \text{Equation 5}$$

$$quantize_n(r) = \frac{1}{2^n} \cdot \text{round}(2^n \cdot r) \qquad \text{Equation 6}$$

The processor 1420 may sequentially perform primary quantization on the global recovery data for each output channel of the current layer. For example, when the current layer includes three output channels, the processor 1420 may quantize global recovery data of the second output channel after quantizing global recovery data of the first output channel, and then quantize global recovery data of the third output channel. As the global recovery data is sequentially quantized for each output channel, the amount of a resource used by the on-chip memory for a quantization process may be reduced, thereby improving the functioning of a device including the on-chip memory with which the neural network may be driven and/or trained.

The processor 1420 may sequentially perform recovery and primary quantization with respect to the output data resulting from the operation of the current layer for each output channel of the current layer. For example, when the current layer includes three output channels, the processor 1420 may recover and quantize the output data of the second output channel after recovering and quantizing the output data of the first output channel, and then recovering and quantizing the output data of the third output channel.

In operation 720, the processor 1420 may store the local quantization data in the memory to perform the operation of the next layer. The memory may be the memory 1410 of the neural network apparatus 1400 or the on-chip memory included in the processor 1420.

The next layer may be, but not limited to, an input layer, a hidden layer, and an output layer, etc., of a DNN. The next layer may be, but not limited to, a layer included in a convolution neural network. The next layer may be, but not limited to, a convolution layer, a pooling layer, a flatten layer, a normalization layer, a fully connected layer, etc.

In operation 730, the processor 1420 may perform secondary quantization on the local recovery data, recovered from the local quantization data based on the local maximum value for each output channel, based on the global maximum value corresponding to the current layer, thus obtaining global quantization data.

The processor 1420 may recover the local quantization data based on the local maximum value for each output channel, thus generating local recovery data. The local quantization data may be recovered for each output channel based on the same local maximum value as in primary quantization. The local quantization data may be dequantized to a scale previous to quantization by being recovered based on the local maximum value for each output channel. For example, the local recovery data may be the same as the global recovery data.

The local quantization data may be recovered based on Equation 4. To recover the local quantization data, the local maximum value for each output channel of the current layer may be used as max (|x|) of Equation 4, and the local quantization data may be used as $\max q_n(x)$.

The processor 1420 may sequentially recover the local quantization data for each output channel of the current layer. For example, when the current layer includes three output channels, the processor 1420 may recover the local quantization data of the second output channel after recovering the local quantization data of the first output channel, and then recover the local quantization data of the third output channel.

The processor 1420 may perform secondary quantization on the local recovery data based on the global maximum value corresponding to the current layer, thus generating global quantization data.

The global maximum value corresponding to the current layer may be a maximum value of the global recovery data. The global maximum value corresponding to the current layer may be calculated based on the local maximum value for each output channel of the current layer. For example, the global maximum value corresponding to the current layer may be a maximum value among local maximum values for all output channels of the current layer.

The local recovery data may be secondarily quantized based on Equation 5 and Equation 6. To secondarily quantize the local recovery data, the global maximum value corresponding to the current layer may be used as max (|x|) of Equation 5.

The processor 1420 may sequentially perform secondary quantization on the local recovery data for each output channel of the current layer. For example, when the current layer includes three output channels, the processor 1420 may quantize local recovery data of the second output channel after quantizing local recovery data of the first output channel, and then quantize local recovery data of the third output channel.

The processor 1420 may sequentially perform recovery and secondary quantization with respect to the local quantization data for each output channel of the current layer. For example, when the current layer includes three output channels, the processor 1420 may recover and quantize the local quantization data of the second output channel after recovering and quantizing the local quantization data of the first output channel, and then recover and quantize the local quantization data of the third output channel.

In operation 740, the processor 1420 may provide the global quantization data as input data for an operation of the next layer.

Figure 8:
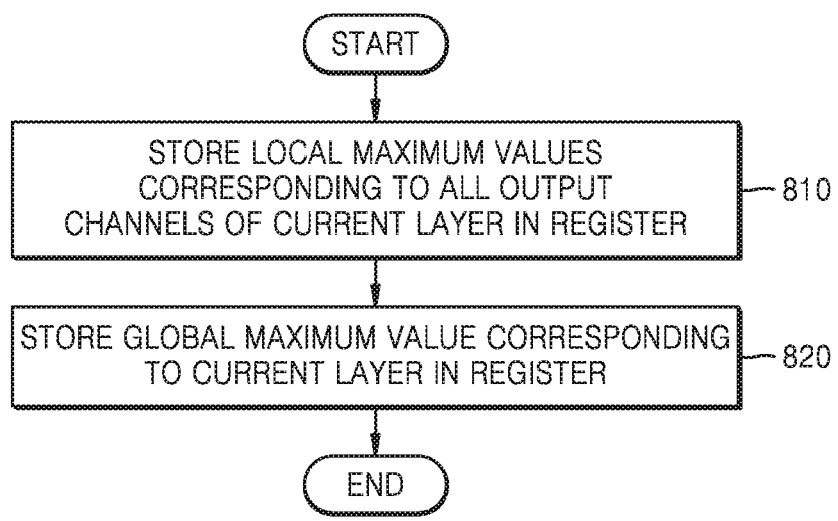
FIG. 8 illustrates storing a local maximum value and a global maximum value according to one or more embodiments of the present disclosure.

FIG. 8 illustrates storing a local maximum value and a global maximum value according to one or more embodiments of the present disclosure.

In operation 810, the processor 1420 may store local maximum values for all output channels of the current layer in a register of the processor 1420. For example, the processor 1420 may store the local maximum values in a register file.

The processor 1420 may obtain the local maximum values by calculating a maximum value of the global recovery data for each of all the output channels of the current layer.

The processor 1420 may sequentially store the local maximum values in the register. For example, when the current layer includes three output channels, the processor 1420 may store a local maximum value calculated from the global recovery data of the first output channel, store a local maximum value calculated from the global recovery data of the second output channel, and then store a local maximum value calculated from the global recovery data of the third output channel.

The processor 1420 may read the local maximum values stored in the register to recover the local quantization data in a subsequent process.

In operation 820, the processor 1420 may store a global maximum value corresponding to the current layer, which is the maximum value among the local maximum values, in the register.

The processor 1420 may obtain the global maximum value corresponding to the current layer, by calculating the maximum value of the local maximum values for all the output channels of the current layer.

The processor 1420 may read the global maximum value stored in the register to secondarily quantize the local recovery data in a subsequent process.

Figure 9:
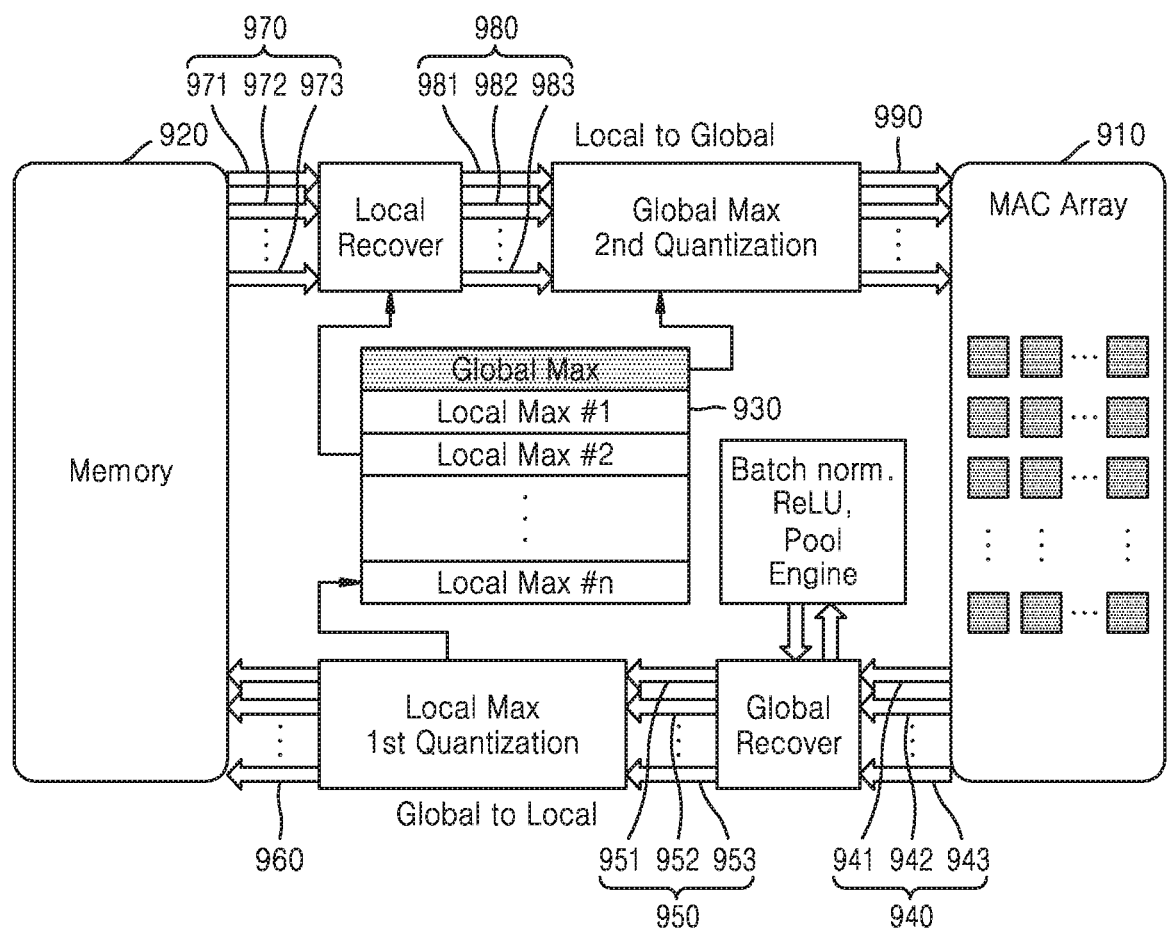
FIG. 9 illustrates quantizing data of a neural network according to one or more embodiments of the present disclosure.

FIG. 9 illustrates quantizing data of a neural network according to one or more embodiments of the present disclosure.

In the neural network, a calculator 910 may perform a convolution operation. Calculators described below may be included in a processing unit of the processor 1420. The calculator 910 may perform an operation of the next layer after performing an operation of the current layer. Output data resulting from the operation of the current layer may be used in the operation of the next layer, after passing through primary quantization and secondary quantization.

When the neural network operates through forward propagation, output data 940 resulting from the operation of the current layer may include activation. When the neural network is trained through backward propagation, output data 940 resulting from the operation of the current layer may include a loss gradient or a weight gradient.

The processor 1420 may recover the output data 940 based on the global maximum value corresponding to the previous layer, thus generating global recovery data 950. The processor 1420 may recover the output data 940 based on the global maximum value corresponding to the previous layer and perform sub-operations such as the pooling operation, arrangement normalization, activation using the activation function, etc., thus generating the global recovery data 950. The processor 1420 may add noise to the output data 940 to generate the global recovery data.

The processor 1420 may recover the output data 940 for each output channel of the current layer. The processor 1420 may sequentially recover the output data 940 for each output channel of the current layer. For example, when the current layer includes n output channels, the processor 1420 may recover output data 942 of the second output channel after recovering output data 941 of the first output channel, and finally recover output data 943 of an $n^{th}$ output channel.

The processor 1420 may calculate local maximum values Local Max #1, Local Max #2, . . . , Local Max #n from global recovery data 950. For example, when the current layer includes n output channels, the processor 1420 may calculate a maximum value of global recovery data 951 of the first output channel as the local maximum value Local Max #1, calculate a maximum value of global recovery data 952 of the second output channel as the local maximum value Local Max #2, and finally calculate a maximum value of global recovery data 953 of the $n^{th}$ output channel as the local maximum value Local Max #n. The calculated local maximum values Local Max #1, Local Max #2, . . . , Local Max #n may be stored in a register 930 of the processor 1420.

The processor 1420 may calculate a global maximum value Global Max corresponding to the current layer from the local maximum values Local Max #1, Local Max #2, . . . , Local Max #n. For example, the processor 1420 may calculate a maximum value of the local maximum values Local Max #1, Local Max #2, . . . , Local Max #n as the global maximum value Global Max corresponding to the current layer. The calculated global maximum value Global Max may be stored in the register 930.

The processor 1420 may primarily quantize the global recovery data 950 based on the local maximum values Local Max #1, Local Max #2, . . . , Local Max #n, thus generating local quantization data 960.

The processor 1420 may primarily quantize the global recovery data 950 for each output channel of the current layer. The processor 1420 may sequentially perform primary quantization on the global recovery data 950 for each output channel of the current layer. For example, when the current layer includes n output channels, the processor 1420 may quantize the global recovery data 952 of the second output channel based on the local maximum value Local Max #2 after quantizing the global recovery data 951 of the first output channel based on the local maximum value Local Max #1, and finally quantize the global recovery data 953 of the $n^{th}$ output channel based on the local maximum value Local Max #n.

The local quantization data 960 may be stored in a memory 920 for use in the operation of the next layer. The memory 920 may be the memory 1410 of the neural network apparatus 1400 or the on-chip memory included in the processor 1420.

The processor 1420 may load local quantization data 970 from the memory 920 and recover the loaded local quantization data 970 based on a local maximum value for each output channel of the current layer, thus generating local recovery data 980. The local maximum value for each output channel of the current layer may be read from the register 930.

The processor 1420 may recover the local quantization data 970 for each output channel of the current layer. The processor 1420 may sequentially recover the local quantization data 970 for each output channel of the current layer. For example, when the current layer includes n output channels, the processor 1420 may recover local quantization data 972 of the second output channel based on the local maximum value Local Max #2 after recovering local quantization data 971 of the first output channel based on the local maximum value Local Max #1, and finally recover local quantization data 973 of the $n^{th}$ output channel based on the local maximum value Local Max #n.

The local recovery data 980 may be the same as the global recovery data 950. For example, when the current layer includes n output channels, the global recovery data 951 of the first output channel may be the same as local recovery data 981, the global recovery data 952 of the second output channel may be the same as local recovery data 982, and finally, the global recovery data 953 of the $n^{th}$ output channel may be the same as local recovery data 983.

The processor 1420 may secondarily quantize the local recovery data 980 based on the global maximum value Global Max corresponding to the current layer, thus generating global quantization data 990. The global maximum value Global Max corresponding to the current layer may be read from the register 930.

The processor 1420 may secondarily quantize the local recovery data 980 for each output channel of the current layer. The processor 1420 may sequentially perform secondary quantization on the local recovery data 980 for each output channel of the current layer. For example, when the current layer includes n output channels, the processor 1420 may quantize the local recovery data 982 of the second output channel based on the global maximum value Global Max after quantizing the local recovery data 981 of the first output channel based on the global maximum value Global Max, and finally quantize the local recovery data 983 of the $n^{th}$ output channel based on the global maximum value Global Max.

The processor 1420 may perform secondary quantization on the local recovery data 980 for all the output channels, thus quantizing the local recovery data 980 to the same scale.

The global quantization data 990 may be input to the calculator 910 for use in the operation of the next layer.

Figure 10:
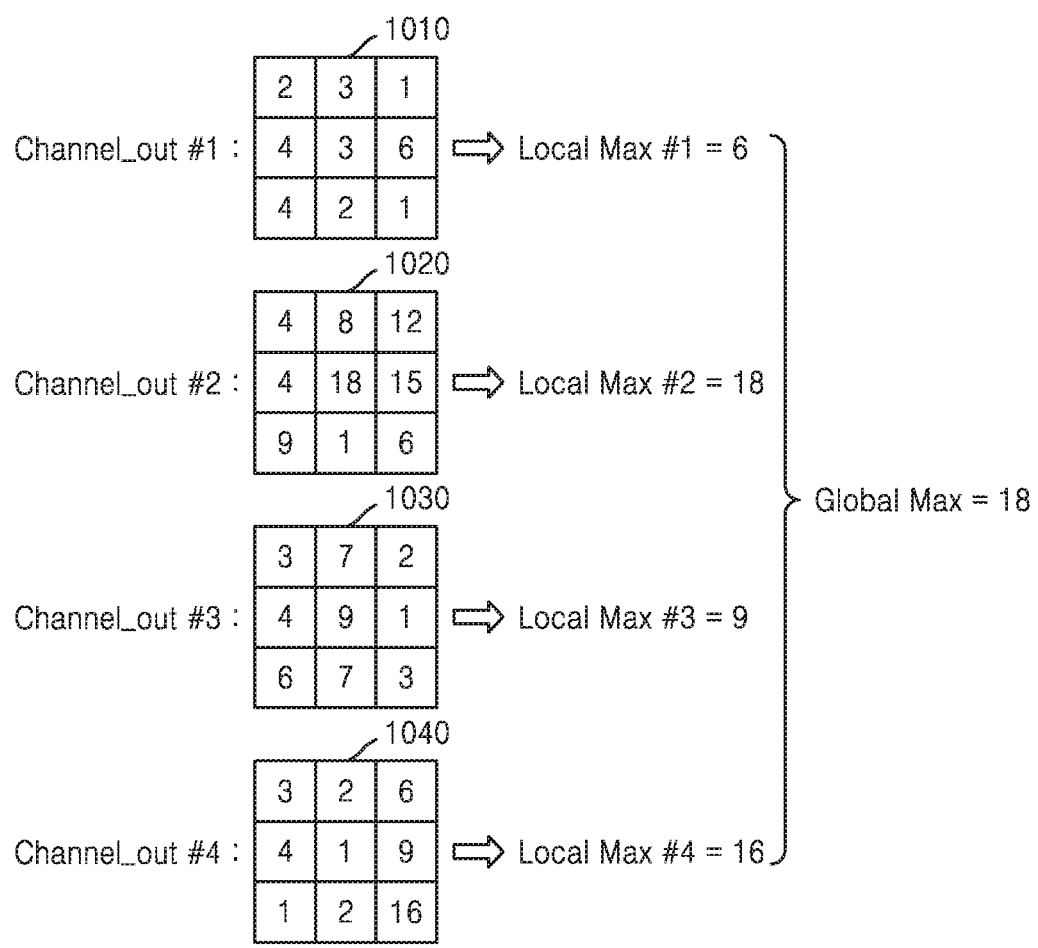
FIG. 10 illustrates obtaining a local maximum value and a global maximum value according to one or more embodiments of the present disclosure.

FIG. 10 illustrates obtaining a local maximum value and a global maximum value according to one or more embodiments of the present disclosure.

When the current layer includes four output channels, a local maximum value may be calculated for each of the four output channels.

The processor 1420 may calculate the local maximum value Local Max #1 for the first output channel from global recovery data 1010 of the first output channel. For example, the processor 1420 may calculate a maximum value of 6 of the global recovery data 1010 of the first output channel as the local maximum value Local Max #1.

Likewise, the processor 1420 may calculate the local maximum values Local Max #2, Local Max #3, and Local Max #4 for the second, third, and fourth output channels from respective global recovery data 1020, 1030, and 1040 for the second, third, and fourth output channels.

The processor 1420 may calculate the global maximum value Global Max corresponding to the current layer from the local maximum values Local Max #1, Local Max #2, Local Max #3, and Local Max #4. For example, the processor 1420 may calculate a maximum value of 18 of the global maximum values Local Max #1, Local Max #2, Local Max #3, and Local Max #4 as the global maximum value Global Max.

Figure 11:
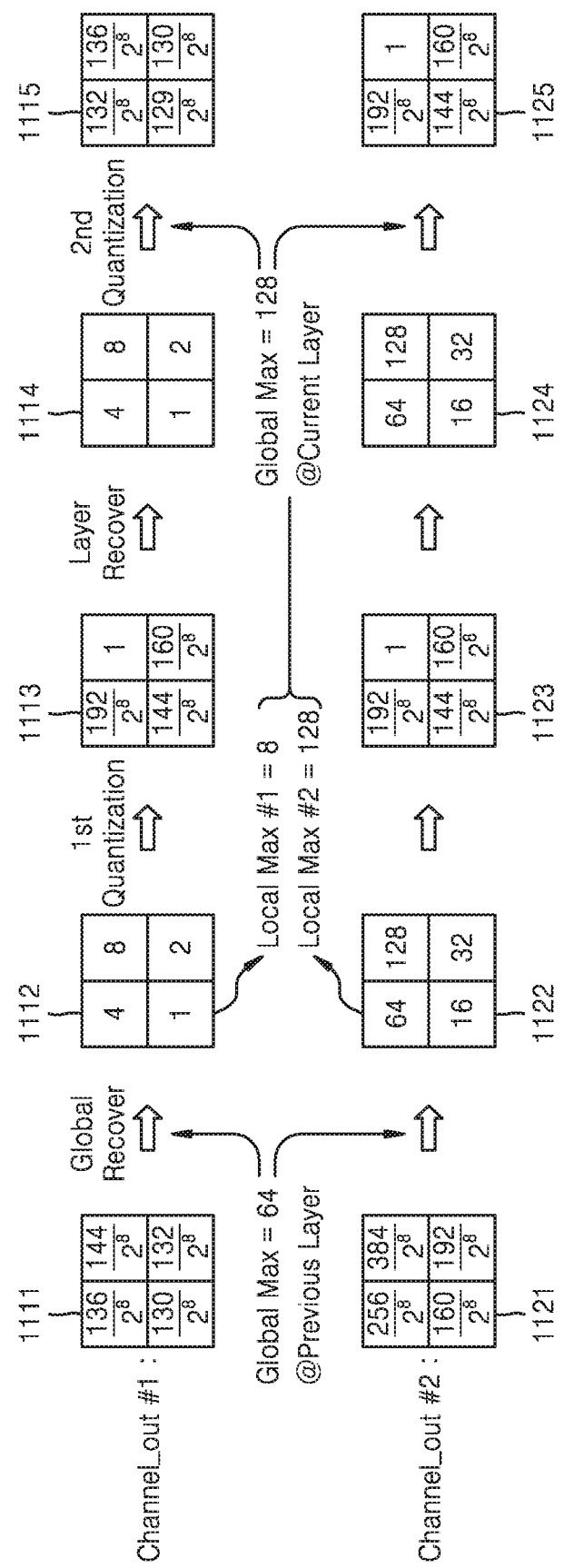
FIG. 11 illustrates primary quantization and secondary quantization for each output channel according to one or more embodiments of the present disclosure.

FIG. 11 illustrates primary quantization and secondary quantization for each output channel according to one or more embodiments of the present disclosure.

More specifically, FIG. 11 shows an example of primarily quantizing and secondarily quantizing output data 1111 and 1121 resulting from an operation of the current layer including two output channels into 8 bits.

The processor 1420 may recover the output data 1111 of a first channel, thus generating global recovery data 1112 of the first channel. The processor 1420 may recover the output data 1111 of the first output channel based on a global maximum value Global Max@Previous Layer corresponding to the previous layer. For example, the output data 1111 may be recovered based on Equation 4, and more specifically, data having a value of $144/2^8$ of the output data 1111 may be recovered based on the global maximum value, 64, Global Max@Previous Layer corresponding to the previous layer, thus generating global recovery data having a value of 8. For example, using Equation 4, when max (|x|) is 64 and $maxq_n(x)$ is $144/2^8$, global recovery data x having a value of 8 may be generated.

The processor 1420 may calculate the local maximum value Local Max #1 for the first channel. For example, the processor 1420 may calculate a maximum value of 8 of the global recovery data 1112 as the local maximum value Local Max #1.

The processor 1420 may primarily quantize the global recovery data 1112 of the first channel based on the local maximum value Local Max #1 for the first channel, thus generating local quantization data 1113 of the first channel. For example, the global recovery data 1112 may be primarily recovered based on Equation 5 and Equation 6, and more specifically, data having a value of 2 of the global recovery data 1112 may be primarily quantized based on the local maximum value, 8, Local Max #1 for the first channel, thus generating local quantization data having a value of $160/2^8$. For example, using Equation 5, when x is 2 and max(|x|) is 8, local quantization data $maxq_n(x)$ having a value of $160/2^8$ may be generated.

Similarly, the processor 1420 may recover the output data 1121 of a second channel, thus generating global recovery data 1122 of the second channel. The processor 1420 may recover the output data 1121 based on a global maximum value Global Max@Previous Layer corresponding to the previous layer. For example, of the output data 1121, data having a value of $38^4/2^8$ may be recovered based on the global maximum value, 64, Global Max@Previous Layer corresponding to the previous layer, thus generating global recovery data having a value of 128. For example, using Equation 4, when max (|x|) is 64 and $\text{maxq}_n(x)$ is $384/2^8$, global recovery data x having a value of 128 may be generated.

Likewise, the processor 1420 may calculate the local maximum value Local Max #2 for the second channel. For example, the processor 1420 may calculate a maximum value of 128 of the global recovery data 1122 as the local maximum value Local Max #2.

Likewise, the processor 1420 may primarily quantize the global recovery data 1122 of the first channel based on the local maximum value Local Max #2 for the second channel, thus generating local quantization data 1123 of the second channel. For example, of the global recovery data 1122, data having a value of 32 may be primarily quantized based on the local maximum value, 8, Local Max #1 for the second channel, thus generating local quantization data having a value of $160/2^8$. For example, using Equation 5, when x is 32 and max(|x|) is 128, local quantization data $\text{maxq}_n(x)$ having a value of $160/2^8$ may be generated.

The processor 1420 may calculate a global maximum value Global Max@Current Layer corresponding to the current layer from the local maximum value Local Max #1 for the first channel and the local maximum value Local Max #2. For example, the processor 1420 may calculate a maximum value, 128, of the local maximum value Local Max #1 for the first channel and the local maximum value Local Max #2 for the second channel, as the global maximum value Global Max@Current Layer corresponding to the current layer.

The local maximum value Local Max #1 for the first channel, the local maximum value Local Max #2 for the second channel, and the global maximum value Global Max@Current Layer corresponding to the current layer may be stored in the register of the processor 1420.

The processor 1420 may recover the local quantization data 1113 of the first channel, thus generating local recovery data 1114 of the first channel. The processor 1420 may recover the local quantization data 1113 of the first output channel based on the local maximum value Local Max #1 for the first channel. For example, the local quantization data 1113 may be recovered based on Equation 4, and more specifically, data having a value of $144/2^8$ of the local quantization data 1113 may be recovered based on the local maximum value, 8, Local Max #1 for the first channel, thus generating local recovery data having a value of 1. For example, using Equation 4, when max (|x|) is 8 and $\text{maxq}_n(x)$ is $144/2^8$, local recovery data x having a value of 1 may be generated.

The processor 1420 may secondarily quantize the local recovery data 1114 of the first channel based on the global maximum value Global Max@Current Layer corresponding to the current layer, thus generating global quantization data 1115 of the first channel. For example, the local recovery data 1114 may be secondarily recovered based on Equation 5 and Equation 6, and data having a value of 4 of the local recovery data 1114 may be secondarily quantized based on the global maximum value, 128, Global Max@Current Layer corresponding to the current layer, thus generating global quantization data having a value of $132/2^8$. For example, using Equation 5, when x is 4 and max(|x|) is 128, global quantization data $\text{maxq}_n(x)$ having a value of $132/2^8$ may be generated.

Likewise, the processor 1420 may recover the local quantization data 1123 of the second channel, thus generating local recovery data 1124 of the second channel. The processor 1420 may recover the local quantization data 1123 of the second output channel based on the local maximum value Local Max #2 for the second channel. For example, of the local quantization data 1123, data having a value of $144/2^8$ may be recovered based on the local maximum value, 128, Local Max #2 for the second channel, thus generating local recovery data having a value of 16. For example, using Equation 4, when max (|x|) is 128 and $\text{maxq}_n(x)$ is $144/2^8$, local recovery data x having a value of 16 may be generated.

The processor 1420 may secondarily quantize the local recovery data 1124 of the second channel based on the global maximum value Global Max@Current Layer corresponding to the current layer, thus generating global quantization data 1125 of the second channel. For example, of the local recovery data 1124, data having a value of 64 may be secondarily quantized based on the global maximum value, 128, Global Max@Current Layer corresponding to the current layer, thus generating global quantization data having a value of $192/2^8$. For example, using Equation 5, when x is 64 and max(|x|) is 128, global quantization data $\text{maxq}_n(x)$ having a value of $192/2^8$ may be generated.

FIG. 12 illustrates a quantization algorithm of data of a neural network (e.g., using the method illustrated in FIG. 7) according to one or more embodiments of the present disclosure.

Referring to FIG. 12, in a quantization algorithm 1200, a backward-propagating loss gradient may be quantized.

In operation 1201, the processor 1420 may recover local quantization data $\text{loss\_gradient}_G$ for each input channel of the current layer, thus generating local recovery data loss_gradient. In this case, the input channel of the current layer may correspond to an output channel in forward propagation. The processor 1420 may recover the local quantization data $\text{loss\_gradient}_G$ based on a local maximum value $\text{local\_maxc}_{in}$.

In operation 1202, the processor 1420 may quantize local recovery data loss_gradient for each input channel of the current layer, thus generating global quantization data $\text{loss\_gradient}_G$. The processor 1420 may quantize the local recovery data loss_gradient based on a global maximum value $\text{global\_max}_i$, thus generating global quantization data $\text{loss\_gradient}_G$.

In operation 1203, the processor 1420 may perform a convolution operation on the global quantization data $\text{loss\_gradient}_G$.

In operation 1204, the processor 1420 may recover output data $\text{loss\_gradient}_G$ resulting from an operation of the current layer for each output channel of the current layer. In this case, the output channel of the current layer may correspond to an input channel in forward propagation. The output data $\text{loss\_gradient}_G$ may be recovered based on the global maximum value $\text{global\_max}_i$.

In operation 1205, the processor 1420 may perform sub-operations such as arrangement normalization, the pooling operation, activation using the activation function, etc., on the recovered data, thus generating global recovery data.

In operation 1206, the processor 1420 may calculate a local maximum value $\text{local\_maxc}_{out}$ for each output channel of the current layer.

In operation 1207, the processor 1420 may quantize global recovery data loss_gradient for each output channel of the current layer, thus generating local quantization data $\text{loss\_gradient}_G$. The processor 1420 may quantize the global recovery data loss_gradient based on the local maximum value local_maxc$_{out}$, thus generating local quantization data loss_gradient$_G$.

In operation 1208, the processor 1420 may calculate a global maximum value global_max$_{i-1}$ from local maximum values local_max$_{c1}$, local_max$_{c2}$, ..., obtained for all the output channels of the current layer.

Figure 13:
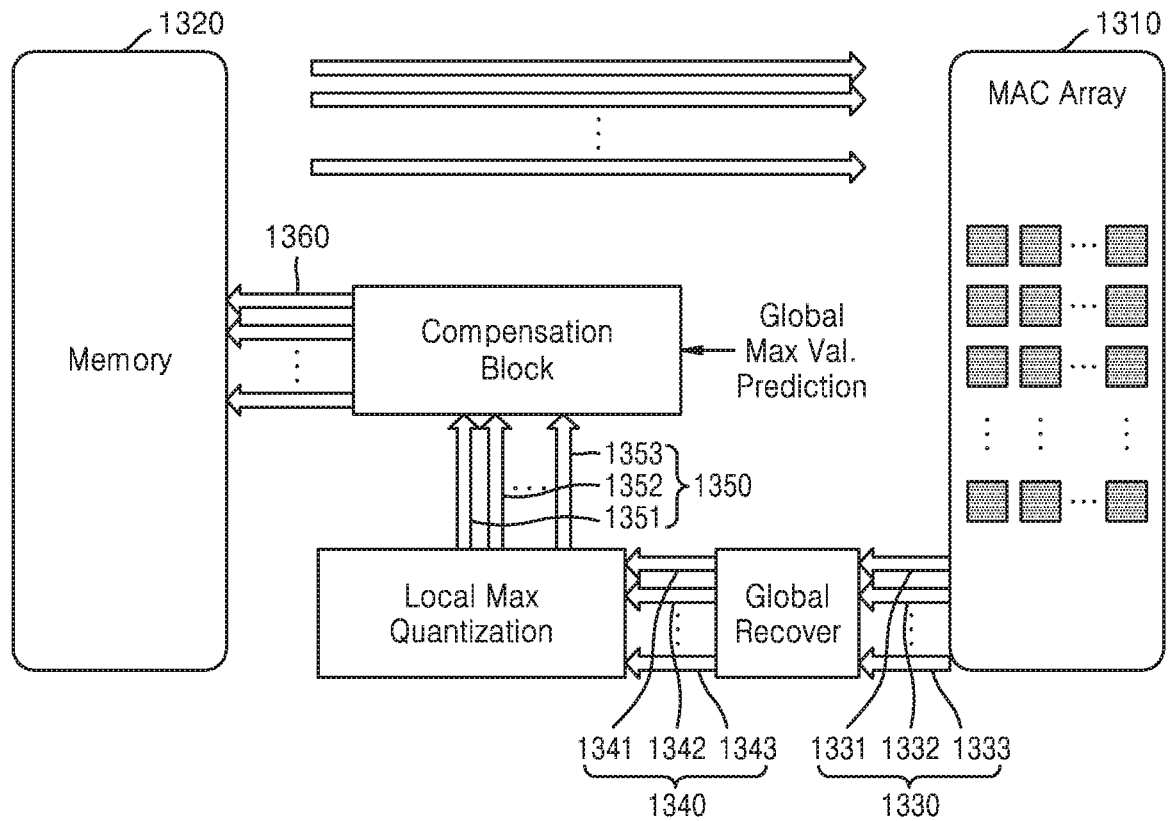
FIG. 13 illustrates quantizing data of a neural network according to one or more embodiments of the present disclosure.

FIG. 13 illustrates quantizing data of a neural network according to one or more embodiments of the present disclosure.

In the neural network, a calculator 1310 may perform a convolution operation. The calculator 1310 may perform an operation of the next layer after performing an operation of the current layer. Output data resulting from the operation of the current layer may be used in the operation of the next layer, after passing through quantization.

When the neural network operates through forward propagation, output data 1330 resulting from the operation of the current layer may include activation. When the neural network is trained through backward propagation, the output data 1330 resulting from the operation of the current layer may include a loss gradient or a weight gradient.

The processor 1420 may predict a global maximum value for recovering the output data 1330. For example, the processor 1420 may predict the global maximum value based on output data resulting from an operation of a previous layer. For example, the processor 1420 may predict the global maximum value based on an aspect of data change in quantization.

The processor 1420 may recover the output data 1330 based on the predicted global maximum value, thus generating global recovery data 1340. The processor 1420 may recover the output data 1330 based on the predicted global maximum value and perform sub-operations such as the pooling operation, arrangement normalization, activation using the activation function, etc., thus generating the global recovery data 1340. The processor 1420 may recover the output data 1330 based on the predicted global maximum value and add noise to the recovered data, thus generating the global recovery data 1340.

The processor 1420 may recover the output data 1330 for each output channel of the current layer. The processor 1420 may sequentially recover the output data 1330 for each output channel of the current layer. For example, when the current layer includes n output channels, the processor 1420 may recover output data 1332 of the second output channel after recovering output data 1331 of the first output channel, and finally recover output data 1333 of an n$^{th}$ output channel.

The processor 1420 may calculate local maximum values from the global recovery data 1340. For example, when the current layer includes n output channels, the processor 1420 may calculate a maximum value of global recovery data 1341 of the first output channel as a local maximum value for the first output channel, calculate a maximum value of global recovery data 1342 of the second output channel as a local maximum value for the second output channel, and finally calculate a maximum value of global recovery data 1343 of the n$^{th}$ output channel as a local maximum value for the n$^{th}$ output channel.

The processor 1420 may generate local quantization data 1350 by quantizing the global recovery data 1340 based on the local maximum values.

The processor 1420 may quantize the global recovery data 1340 for each output channel of the current layer. The processor 1420 may sequentially quantize the global recovery data 1340 for each output channel of the current layer. For example, when the current layer includes n output channels, the processor 1420 may quantize the global recovery data 1341 of the first output channel based on the local maximum value for the first output channel, quantize the global recovery data 1342 of the second output channel based on the local maximum value for the second output channel, and finally quantize the global recovery data 1343 of the n$^{th}$ output channel based on the local maximum value for the n$^{th}$ output channel.

The processor 1420 may compensate for the local quantization data 1350 based on a difference between a local maximum value for each output channel of the current layer and the predicted global maximum value, thus generating global quantization data 1360. For example, when the local maximum value for each output channel and the predicted global maximum value are equal to each other, the processor 1420 may set the local quantization data 1350 as the global quantization data 1360. For example, when the local maximum value for each output channel is less than the predicted global maximum value, the processor 1420 may perform compensation in such a way to reduce the local quantization data 1350 in proportional to the difference between the local maximum value and the predicted global maximum value, thus generating the global quantization data 1360.

The processor 1420 may compensate for the local quantization data 1350 for each output channel of the current layer. The processor 1420 may sequentially compensate for the local quantization data 1350 for each output channel of the current layer. For example, when the current layer includes n output channels, the processor 1420 may compensate for local quantization data 1351 of the first output channel based on a difference between a first local maximum value and the predicted global maximum value, compensate for local quantization data 1352 of the second output channel based on a difference between a second local maximum value and the predicted global maximum value, and finally compensate for local quantization data 1353 of the n$^{th}$ output channel based on a difference between an n$^{th}$ local maximum value and the predicted global maximum value.

The amount of resources used by the register in quantization may be reduced because the processor 1420 generates the global quantization data 1360 without storing the local maximum values in the register.

The global quantization data 1360 may be stored in and read from the memory 1320 and input to the calculator 1310 for use in an operation of the next layer. The memory 1320 may be the memory 1410 of the neural network apparatus 1400 or the on-chip memory included in the processor 1420.

Figure 14:
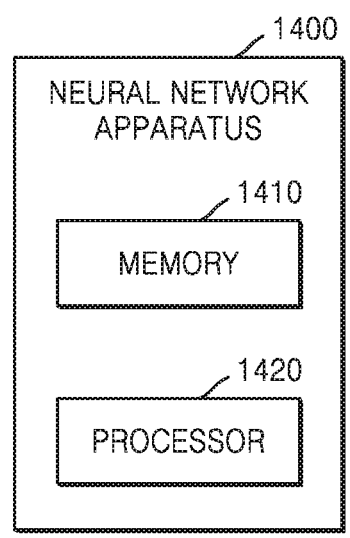
FIG. 14 illustrates a neural network apparatus according to one or more embodiments of the present disclosure.

FIG. 14 illustrates a neural network apparatus according to one or more embodiments of the present disclosure.

Referring to FIG. 14, a neural network apparatus 1400 may include a memory 1410 and a processor 1420. The neural network apparatus 1400 may be connected with an external memory. The neural network apparatus 1400 illustrated in FIG. 14 may include components associated with the current embodiment. Thus, it will be understood to one of ordinary skill in the art after an understanding of the present disclosure that other general-purpose components other than the components illustrated in FIG. 14 may be further included in the neural network apparatus 1400.

The neural network apparatus 1400 may be an apparatus in which the above-described neural network is implemented with reference to FIGS. 1-13. For example, the neural network apparatus 1400 may be implemented as, or with, various types of devices such as a personal computer (PC), a server device, a mobile device, an embedded device, etc. In detail, the neural network apparatus 40 may be included in a smartphone, a tablet device, an augmented reality (AR) device, an Internet of Things (IoT) device, an autonomous vehicle, a robotic device, or a medical device, which performs voice recognition, image recognition, and image classification using a neural network, but is not limited thereto. The neural network apparatus 1400 may correspond to an exclusive hardware (HW) accelerator mounted on such a device, and may be an HW accelerator, such as a neural processing unit (NPU), a tensor processing unit (TPU), or a neural engine, which is an exclusive module for driving a neural network. The neural network apparatus 1400 may be the neural network device 51 or the neural network inference device 53 of FIG. 5.

The memory 1410 may store various data processed in the neural network apparatus 1400. For example, the memory 1410 may store data processed or to be processed in the neural network apparatus 1400 for processing data. Also, the memory 1410 may store applications or drivers to be driven by the neural network apparatus 1400.

For example, the memory 1410 may include random-access memory (RAM), such as dynamic random-access memory (DRAM) or static random-access memory (SRAM), read-only memory (RAM), electrically erasable programmable read-only memory (EEPROM), a CD-ROM, a Blu-ray disk, optical disk storage, a hard disk drive (HDD), a solid state drive (SSD), or a flash memory.

The processor 1420 may control overall functions for executing the neural network apparatus 1400 in a neural network. For example, the processor 1420 may control the neural network apparatus 1400 for processing data in general by executing programs stored in the memory 1410. The processor 1420 may be implemented as a central processing unit (CPU), a graphics processing unit (GPU), or an application processor (AP) included in the neural network apparatus 1400, but is not limited thereto.

The processor 1420 may read or write data, for example, image data, feature map data, or kernel data, from or to the memory 1410, and execute the neural network by using the read/written data. When the neural network is executed, the processor 1420 may drive processing units provided therein to repeatedly perform an operation between an input feature map and a kernel, thereby generating data related to an output feature map. Here, an operation count of the operation may be determined based on various factors, such as the number of channels of the input feature map, the number of channels of the kernel, the size of the input feature map, the size of the kernel, and precision of a value.

For example, the processing unit may include a logic circuit for an operation. More specifically, the processing unit may include a calculator implemented with a combination of a multiplier, an adder, and an accumulator. The multiplier may include a combination of a plurality of sub-multipliers, and the adder may also include a combination of a plurality of sub-adders.

The processor 1420 may further include an on-chip memory in charge of a register (or a register file) and a cache to process an operation and a dispatcher that dispatches various operands, such as pixel values of an input feature map or weights of filters. For example, the dispatcher may dispatch operands such as pixel values and weights required for an operation to be performed by a processing unit from data stored in the memory 1410 to the on-chip memory. Then, the dispatcher may dispatch the operands dispatched to the on-chip memory again to a processing unit for the operation.

The neural network learning devices, neural network inference devices, calculators, memories, buffers, calculators, registers, neural network apparatuses, processors, neural network learning device 51, neural network inference device 43, calculator 61, memory 62, buffer 63, calculator 910, memory 920, register 930, calculator 1310, memory 1320, neural network apparatus 1400, memory 1410, processor 1420, and other apparatuses, units, modules, devices, and other components described herein with respect to FIGS. 1-14 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for an electronic device including a memory in a processor of the electronic device, the method comprising:

obtaining local quantization data by firstly quantizing, based on a local maximum value for each output channel of a current feedforward layer among sequential feedforward layers of a neural network, global recovery data obtained by recovering output data of an operation of the current layer based on a global maximum value output from a previous feedforward layer immediately preceding the current layer among the sequential feedforward layers;

storing the local quantization data in the memory to perform an operation of a next layer of the neural network;

obtaining global quantization data by secondarily quantizing, based on a global maximum value corresponding to the current layer, local recovery data obtained by recovering the local quantization data based on the local maximum value for each output channel of the current layer; and providing the global quantization data as input data for the operation of the next layer, wherein the global recovery data is sequentially quantized for each output channel of the current layer, a resource used by the memory for the operation is reduced compared to using the memory for all output channels of the current layer.

2. The method of claim 1, wherein the recovering of the output data of the operation of the current layer comprises recovering the output data of the operation of the current layer for each output channel based on the global maximum value output from the previous layer, and the global maximum value output from the previous layer is generated based on data obtained by recovering the output data of an operation of the previous layer.

3. The method of claim 1, wherein the firstly quantizing of the global recovery data comprises firstly quantizing the global recovery data for each output channel respectively based on the local maximum value that is a maximum value of the global recovery data for the output channel, such that the maximum value of the global recovery data for each output channel is quantized into a same value.

4. The method of claim 1, wherein the recovering of the local quantization data comprises recovering the local quantization data for each output channel respectively based on the local maximum value that is a maximum value of the global recovery data for the output channel, such that the local quantization data is recovered to data previous to the first quantization.

5. The method of claim 1, wherein the secondarily quantizing of the local recovery data comprises secondarily quantizing the local recovery data for each output channel based on the global maximum value that is a maximum value of the local recovery data, such that the local recovery data is quantized to a same scale.

6. The method of claim 1, wherein the obtaining of the local quantization data further comprises:
recovering the output data of the operation of the current layer based on the global maximum value output from the previous layer; and
obtaining the global recovery data by performing a pooling operation on the recovered data.

7. The method of claim 1, further comprising:
storing the local maximum value for each output channel of the current layer, the local maximum values being obtained by calculating a maximum value of the global recovery data for each output channel of the current layer; and
storing, in a register, the global maximum value corresponding to the current layer, the global maximum value corresponding to the current layer being obtained by calculating a maximum value of the local maximum values.

8. The method of claim 1, wherein the obtaining of the local quantization data is sequentially performed for each output channel.

9. The method of claim 1, wherein
the operation of the current layer and the operation of the next layer are based on backward propagation, and
the output data of the operation of the current layer and the input data for the operation of the next layer comprise either one of an activation, a loss gradient, and a weight gradient.

10. The method of claim 1, further comprising training the neural network by performing the operation of the next layer based on the global quantization data.

11. A non-transitory computer-readable storage medium storing instructions that, when executed by a processor, configure the processor to perform the method of claim 1.

12. An electronic apparatus, the apparatus comprising:
a memory storing instructions; and
a processor configured to quantize data of a neural network by executing the instructions,
wherein the processor is further configured to:
obtain local quantization data by firstly quantizing, based on a local maximum value for each output channel of a current feedforward layer among sequential feedforward layers of a neural network, global recovery data obtained by recovering output data of an operation of the current layer based on a global maximum value output from a previous feedforward layer immediately preceding the current layer among the sequential feedforward layers;
store the local quantization data in the memory to perform an operation of a next layer of the neural network;
obtain global quantization data by secondarily quantizing, based on a global maximum value corresponding to the current layer, local recovery data obtained by recovering the local quantization data based on the local maximum value for each output channel of the current layer; and
provide the global quantization data as input data for an operation of a next layer,
wherein the global recovery data is sequentially quantized for each output channel of the current layer, a resource used by the memory for the operation is reduced compared to using the men put channels of the current layer.

13. The apparatus of claim 12, wherein
for the recovering of the output data of the operation of the current layer, the processor is further configured to recover the output data of the operation of the current layer for each output channel based on the global maximum value output from the previous layer, and
the global maximum value output from the previous layer is generated based on data obtained by recovering the output data of an operation of the previous layer.

14. The apparatus of claim 12, wherein, for the firstly quantizing of the global recovery data, the processor is further configured to firstly quantize the global recovery data for each output channel respectively based on the local maximum value that is a maximum value of the global recovery data for the output channel, such that the maximum value of the global recovery data for each output channel is quantized into a same value.

15. The apparatus of claim 12, wherein, for the recovering of the local quantization data, the processor is further configured to recover the local quantization data for each output channel respectively based on the local maximum value that is a maximum value of the global recovery data for the output channel, such that the local quantization data is recovered to data previous to the first quantization.

16. The apparatus of claim 12, wherein, for the secondarily quantizing of the local recovery data, the processor is further configured to secondarily quantize the local recovery data for each output channel based on the global maximum value that is a maximum value of the local recovery data, such that the local recovery data is quantized to a same scale.

17. The apparatus of claim 12, wherein, for the obtaining of the local quantization data, the processor is further configured to:
recover the output data of the operation of the current layer based on the global maximum value output from the previous layer; and
obtain the global recovery data by performing a pooling operation on the recovered data.

18. The apparatus of claim 12, wherein the processor is further configured to:
store the local maximum value for each output channel of the current layer, the local maximum values being obtained by calculating the maximum value of the global recovery data for each of all output channels of the current layer; and
store, in a register, the global maximum value corresponding to the current layer, the global maximum value corresponding to the current layer being obtained by calculating a maximum value of the local maximum values.

19. The apparatus of claim 12, wherein, for the obtaining of the local quantization data, the processor is further configured to sequentially obtain the local quantization data for each output channel.

20. The apparatus of claim 12, wherein
the processor is further configured to perform the operation of the current layer and the operation of the next layer based on backward propagation, and
the output data of the operation of the current layer and the input data for the operation of the next layer each comprise any one of an activation, a loss gradient, and a weight gradient.

* * * * *